US007187672B1

(12) United States Patent
Vishnu

(10) Patent No.: US 7,187,672 B1
(45) Date of Patent: Mar. 6, 2007

(54) CONNECTION REARRANGEMENT IN COMMUNICATION SWITCHES

(75) Inventor: Meenaradchagan Vishnu, Petaluma, CA (US)

(73) Assignee: Calix Networks, Inc., Petaluma, CA (US)

( * ) Notice: Subject to any disclaimer, the term of this patent is extended or adjusted under 35 U.S.C. 154(b) by 908 days.

(21) Appl. No.: 10/147,446

(22) Filed: May 15, 2002

(51) Int. Cl.
*H04Q 11/00* (2006.01)
*H04Q 3/00* (2006.01)
*H04J 3/02* (2006.01)

(52) U.S. Cl. ...................... 370/360; 370/376; 370/386; 370/539; 340/2.28

(58) Field of Classification Search ................ 370/279, 370/360, 321, 370
See application file for complete search history.

(56) References Cited

U.S. PATENT DOCUMENTS

| | | | | |
|---|---|---|---|---|
| 3,736,381 | A | | 5/1973 | Johnson et al. ............... 179/15 |
| 5,276,425 | A | | 1/1994 | Swanson et al. ............ 340/826 |
| 5,301,055 | A | * | 4/1994 | Bagchi et al. ................ 398/54 |
| 5,450,074 | A | | 9/1995 | Yoshifuji ................. 340/825.8 |
| 5,634,004 | A | | 5/1997 | Gopinath et al. ...... 395/200.02 |
| 5,889,775 | A | | 3/1999 | Sawicz et al. ............... 370/360 |
| 5,987,027 | A | | 11/1999 | Park et al. .................. 370/360 |
| 6,085,216 | A | * | 7/2000 | Huberman et al. .......... 718/104 |
| 6,192,475 | B1 | * | 2/2001 | Wallace ...................... 713/190 |
| 6,327,253 | B1 | | 12/2001 | Frink ......................... 370/260 |
| 6,950,418 | B1 | * | 9/2005 | Young et al. ............... 370/337 |

| | | | |
|---|---|---|---|
| 2002/0124239 | A1 | * | 9/2002 | Nelson ........................ 717/140 |
| 2003/0161268 | A1 | * | 8/2003 | Larsson et al. ............. 370/229 |

OTHER PUBLICATIONS

V.E. Benes, "On Rearrangeable Three -Stage Connecting Networks", The Bell System Technical Journal vol. XLI, Sep. 1962, No. 5, pp. 1481-1491.
M.C. Paull, "Reswitching of Connection Networks", The Bell System Technical Journal, 41 (3), May 1962, pp. 833-853.
Daniel Brélaz, "New Methods to Color the Vertices of a Graph", Communication of the ACM, Apr. 1979, vol. 22, No. 4, pp. 251-256.
A.E. Eiben, J.K. van der Hauw, "Graph Coloring with Adaptive Genetic Algorithms", Journal of Heuristics, 4(1), 1998, pp. 1-43, www.wi.leidenuniv.nl/TechRep/tr96-11.html.
Hantao Xhang et al., "Implementing the Davis-Putnam Method", Journal of Automatic Reasoning, 24(1/2) 2000, pp. 1-23.

(Continued)

*Primary Examiner*—Chi Pham
*Assistant Examiner*—Melanie Jagannathan
(74) *Attorney, Agent, or Firm*—Silicon Valley Patent Group LLP

(57) ABSTRACT

A processor is programmed to reduce a problem of adding a new connection to a time-space-time (TST) switch of a communication network into a problem of graph theory, and to solve the problem using a heuristic instead of an exact algorithm. A solution, if provided by the heuristic, is used to rearrange the connections in the TST switch. Several embodiments of such a programmed processor reduce a connection rearrangement problem of a TST switch into any one of the NP-complete problems (such as the vertex coloring problem or the boolean satisfiability (SAT) problem). In some such embodiments, the processor is programmed based on the Brélaz heuristic to find a solution to the vertex coloring problem. In other embodiments, other heuristics, such as a genetic algorithm, may be used.

21 Claims, 7 Drawing Sheets

OTHER PUBLICATIONS

C. Clos, "A Study of Non-blocking Switching Networks", The Bell Systems Technical Journal, 32:406-424, Mar. 1953.

V. E. Benes, "Mathematical Theory of Connecting Networks and Telephone Traffic," Academic Press, 1965.

Y. Yang, "Nonblocking Broadcast Switching Networks," JSSE Transactions on Computers, vol. 40, No. 9, Sep. 1991, pp. 1005-1015.

S. Skiena, "Finding a Vertex Coloring." §5.5.3 in Implementing Discrete Mathematics: Combinatorics and Graph Theory with Mathematica. Reading, MA: Addison-Wesley, pp. 214-215, 1990.

Davis, M. and Putnam, H. "A Computing Procedure for Quantification Theory", Journal of the Association for Computing Machinery, 7(3) (Jul. 1960), 201-215.

Maher Ali and Jitender S. Deogun, "Cost-Effective Implementation of Multicasting In Wavelength-Routed Networks," IEEE Journal of Lightwave Technology, vol. 18, No. 12, Dec. 2000, pp. 1628-1638.

File History of U.S. Appl. No. 10/199,996 by Meenaradchagan Vishnu entitled "Arbiter for an Imput Buffered Communication Switch".

* cited by examiner

US 7,187,672 B1

CONNECTION REARRANGEMENT IN COMMUNICATION SWITCHES

CROSS-REFERENCE TO ATTACHED SOFTWARE APPENDIX

Appendix A contains the following files in one CD-ROM (of which two identical copies are attached hereto), and is a part of the present disclosure and is incorporated by reference herein in its entirety.

```
Volume in drive D is 020515_1258
Volume Serial Number is 9DA7-504F
Directory of D:\
05/15/2002 01:16p        8,920 BRELAZ.CC
05/15/2002 01:16p        1,697 BRELAZ.HH
05/15/2002 01:16p        3,168 CONNEC_1.HH
        3 File(s)       13,785 bytes
Total Files Listed:
        3 File(s)       13,785 bytes
        0 Dir(s)        0 bytes free
```

The files of Appendix A form source code of computer programs for an illustrative embodiment of the present invention.

The file BRELAZ.CC contains computer instructions in the language C++ for describing the behavior of a controller in adding a new connection in a time-space-time switch by rearranging existing connections if necessary. Files BRELAZ.HH and CONNEc_1.HH provide definitions of various constants and data structures used by the computer instructions in the file BRELAZ.CC.

COPYRIGHT NOTICE

A portion of the disclosure of this patent document contains material that is subject to copyright protection. The copyright owner has no objection to the facsimile reproduction by anyone of the patent document or the patent disclosure, as it appears in the in the Patent and Trademark Office patent files or records, but otherwise reserves all copyright rights whatsoever.

BACKGROUND

Synchronous Optical Network (SONET) equipment such as the digital cross-connects (DCC) and add-drop multiplexors (ADM) use circuit switches. In low bandwidth (e.g. OC12) equipments, circuit switches can be implemented using shared memory or a shared bus architecture. However, higher speed circuit switches are often implemented as time-space-time (TST) switches. Time-space-time (TST) switches are well known in the art, and are described in, for example, U.S. Pat. No. 3,736,381 (that is incorporated by reference herein in its entirety) entitled "Time Division Switching System" granted to Johnson et al on May 29, 1973.

One such prior art TST switch 100 (shown in FIG. 1A) is implemented internally by an M×M space switch 102 with one of time switches 101A–101M (wherein A≦I≦M, M being the total number of input time switches) connected to each of its input ports and one of time switches 103A–103M connected at each of its output ports. The value of M depends on the number of streams of information that are to be handled by switch 100, e.g. the value of M may be 32, in which case the space switch may be a 32×32 crossbar.

Time switch 101I receives a stream of information (such as SONET or SDH frames), and rearranges portions of the information before supplying the information to the input port of space switch 102. A control matrix (not shown) for time switch 101I consists of a one-dimensional matrix of size N, where a permutation of the numbers 1, 2 . . . N is stored. The value of N depends on the granularity at which switching is to be done and the line rate, e.g. for an OC-48 line rate and a granularity of STS-1, the value of N would be 48. A value "j" in the ith position in the control matrix means that information received in the ith time slot is switched to the jth slot position.

Another control matrix (also not shown) of space switch 102 consists of a two-dimensional M×N matrix, where a value i in the (j,k)th location means that input port i is to be connected to output port j during time slot k. Such a single connection between a single input port to a single output port is commonly referred to as a unicast connection.

A multicast connection from input port i to multiple output ports w and p during time slot k may be set up by setting both the (w,k)th and (p,k)th locations to value i. If bandwidth more than a single time slot is required then multiple time slots may need to be used in the space switch. The term "connection" refers to a single time slot connection, and as just noted, m time slots may sometimes be required to set up high bandwidth connections between specified input-output ports. In such a case, m single time slot connections are made.

To set up a single time slot connection (hereinafter simply "connection"), logic (that is not shown, but located in TST switch 100) first determines which time slot $t_S$ in space switch 102 is to be used for the connection. Once time slot $t_S$ is determined, then a control matrix of the appropriate input time switch 101I is set to map the connection from its incoming time slot to slot $t_S$ and the appropriate output time switch 103J is set to map from slot $t_S$ to the desired outgoing time slot.

If the time slot $t_S$ that is determined for the new connection is currently in use by an existing connection, then that existing connection may be moved to different time slot in space switch 102, to make room for the new connection. For more information on such rearrangement, see, for example, U.S. Pat. No. 5,889,775 (incorporated by reference herein in its entirety) granted to Sawicz et al. on Mar. 30, 1999, and U.S. Pat. No. 5,987,027 (that is incorporated by reference herein in its entirety) granted to Park, et al. on Nov. 16, 1999. To rearrange connections in a hitless fashion, new values may be written to a standby control matrix (not shown) and the switch is instructed to use the standby control matrix at the beginning of the next time slot, e.g. at the next frame boundary.

A TST switch (FIG. 1A) with N time slots and M switch ports is equivalent to a Clos network C (m, n, r) illustrated in FIG. 1B, with m=N,n=N and r=M. Clos networks (FIG. 1B) are well known, and are described by, for example, C. Clos in an article entitled "A Study of Non-blocking Switching Networks", The Bell Systems Technical Journal, 32:406–424, March 1953. See also the descriptions by V. E. Benes in a book entitled "On Rearrangeable Three-stage Connecting Networks", The Bell Systems Technical Journal, 41(5):1481–1492, September 1962, by V. E. Benes in another article entitled "Mathematical Theory of Connecting Networks and Telephone Traffic," Academic Press, 1965.

If a demultiplexor is added to each of input ports and a multiplexor is added to each of the output ports of a Clos network (FIG. 1B), then functionally, the resulting network is equivalent to a TST switch (FIG. 1A). Hence, by Slepian- Duguid's theorem (which states that a Clos network C(n; m; r) is rearrangeably nonblocking if m≧n.), the TST switch is rearrangeably nonblocking. A rearrangeably nonblocking switch adds connections by performing rearrangement of the time slots of existing connections, if necessary.

On the other hand, a switch is strictly nonblocking if a new connection can be added as long as there is a free time slot at the input and output ports. To make a TST switch strictly nonblocking, it would be necessary to increase the speed of the space switch by two, or reduce the traffic load by half. Specifically, a Clos network C(n,m,r) is nonblocking if m≧2n−1. Therefore, if the number of time slots handled by the space switch is 2N or if only half of the N time slots at each input port is used, then the TST switch is nonblocking.

Routing methods that permit a CLOS network to handle both point-to-point and broadcast connections are described in, for example, U.S. Pat. Nos. 5,450,074 and 5,276,425 both of which are incorporated by reference herein in their entirety. See also an article entitled "Nonblocking Broadcast Switching Networks," by Yang, Y., JSSE Transactions on Computers, Vol. 40, No. 9, September 1991, pp. 1005–1015 that is also incorporated by reference herein in its entirety.

When all connections are unicast, then Paull's rearrangement algorithm can be used when adding new connections to a communication switch. Paull's algorithm is described in detail in an article entitled "Reswitching of Connection Networks" by M. C. Paull, The Bell Systems Technical Journal, 41(3):833–855, May 1962, and this article is incorporated by reference herein in its entirety.

Depending on the application, a single connection that uses multiple input ports and multiple output ports (MIMO) may need to be set up through the switch. Such connections cannot be rearranged using Paull's algorithm, because Paull's algorithm can only handle unicast connections.

SUMMARY

In accordance with the invention, a problem of adding a new connection (which can be a MIMO connection, a multicast connection or a unicast connection) to a communication switch (such as a time-space-time (TST) switch) is reduced into an NP-complete problem (such as a graph vertex coloring problem). The NP-complete problem is solved using a heuristic instead of an exact algorithm. Alternatively, an exact algorithm may be used, so long as there is a constraint on a resource used by the algorithm, such as a time constraint or a memory constraint. A solution, if provided by the heuristic (or the resource-constrained algorithm), is used to set up the new connection (as well as rearranging the existing connections if necessary).

Several embodiments of such a controller reduces a connection rearrangement problem of a TST switch into a vertex (also called "node") coloring problem in a graph. In some such embodiments, the controller is programmed to use the Brélaz heuristic to find a solution to the vertex coloring problem. However, in other embodiments, other heuristics may be used, such as the genetic algorithm, simulated annealing and integer programming. Moreover, in still other embodiments, a connection rearrangement problem for a communication switch may be reduced into, for example, a boolean satisfiability problem, a graph clique problem, or a graph maximum independent set problem. Thereafter, heuristics for such problems may be used to find a solution which is then used in the communication switch.

Although certain embodiments use a representation such as a graph, in other embodiments no representation is used and instead a heuristic (or resource-constrained algorithm) normally applied to a NP-complete problem is itself mapped into a connection rearrangement problem (e.g. the heuristic is used to assign time slots to connections).

DETAILED DESCRIPTION

In accordance with the invention, a problem of adding a new connection to a communication switch (such as a time-space-time (TST) switch) is reduced (as per act 201 in FIG. 2A) into an NP-complete problem (such as a graph vertex coloring problem). Thereafter, a heuristic is applied (as per act 202 in FIG. 2A) to the NP-complete problem. A solution, if provided by the heuristic is used (as per act 203 in FIG. 2A) to set up the new connection (as well as rearranging the existing connections if necessary).

Use of a heuristic in act 202 causes a processor (also called "controller") of the communication switch to not set up (i.e. block) one or more connections that would be otherwise set up if the processor were to be programmed to solve the problem exactly. The disadvantage of blocked connections is offset by the following advantage: use of a heuristic provides a result sufficiently fast for use in real time operation of the communication switch.

Although certain embodiments, implementation and examples are discussed below, the existing connections and the new connection may be mapped into any NP-complete problem well known in the art. Furthermore, a solution to the NP-complete problem may be found by applying any heuristic well known in the art. The specific heuristic that is used is specific to the design of each communication switch, e.g. depending on computing resources (e.g. speed and memory of a controller), characteristics of the switch (e.g. number of time slots available, and the number of ports), and characteristics of the connections (e.g. the percentage of MIMO connections, and the fanout of the connections). Note that instead of a heuristic, any exact algorithm may be used so long as the algorithm is resource limited, e.g. limited in computation time or limited in the amount of memory that can be used.

A new connection through a time-space-time (TST) switch is set up in certain embodiments of the invention by: (a) generating (as per act 201 in FIG. 2B) a graph based on existing connections and the new connection; (b) applying a heuristic to the graph (as per act 202 in FIG. 2B), to assign to each connection a time slot during which a space switch in the TST switch can be used for the connection; and (c) setting up each connection (as per act 203 in FIG. 2B) in a time slot assigned to the connection by the heuristic, if the heuristic is successful.

Figure 2A:
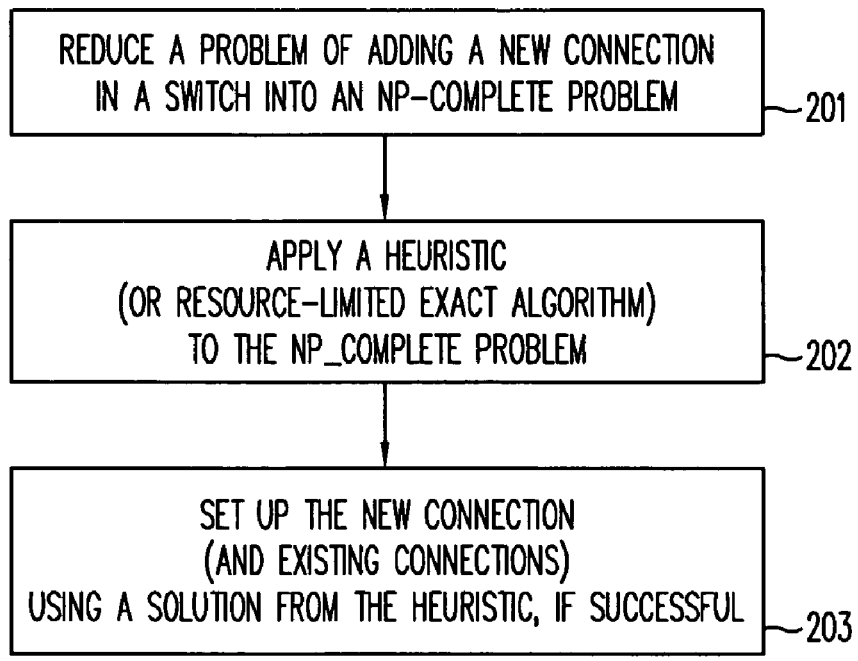
FIG. 2A illustrates, in a high-level flow chart, acts performed in accordance with the invention to add a new connection to a communication switch.

In one embodiment, a processor (also called controller) 221 (FIG. 2C) stores the above-described graph in a region 223B of a memory 223, and executes software instructions from a region 223A of memory 223 to apply the heuristic to the graph. If the heuristic is successful, the results are loaded into a map (also called "switch control store") 222 that is used by communication switch 220 in the normal manner. For example, assignment of time slots to connections may be loaded into a standby memory (not shown) which is different from memory 222 so that current operation of communication switch 220 is not affected during the loading, and a switchover is performed from using memory 222 to using the standby memory at the beginning of the next time slot. Therefore, in some embodiments, addition of a new connection is done in an "hitless" manner.

Figure 1A:
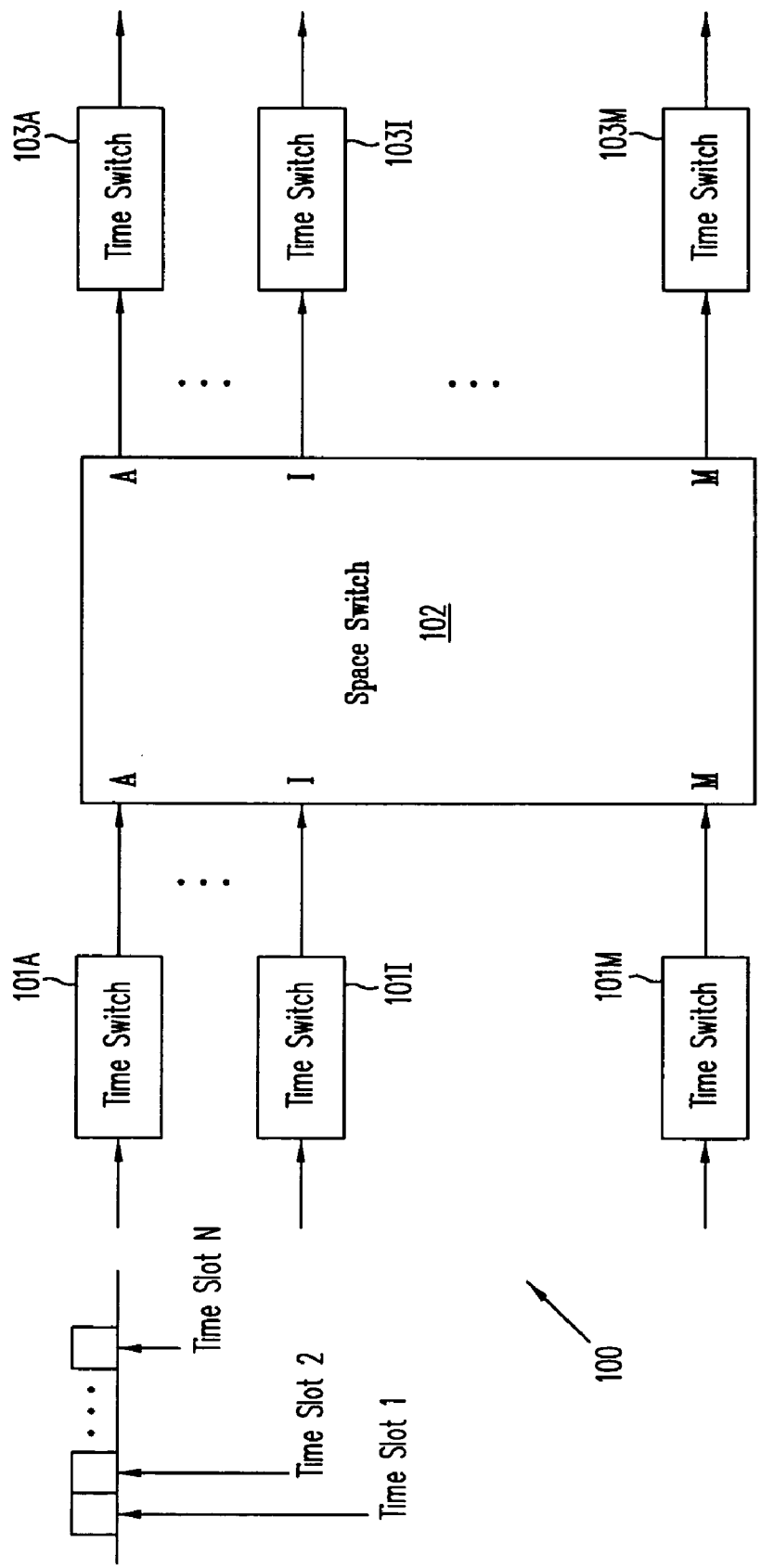
FIGS. 1A and 1B illustrate, in high level block diagrams, a time-space-time (TST) switch and a Clos network respectively.
Figure 1B:
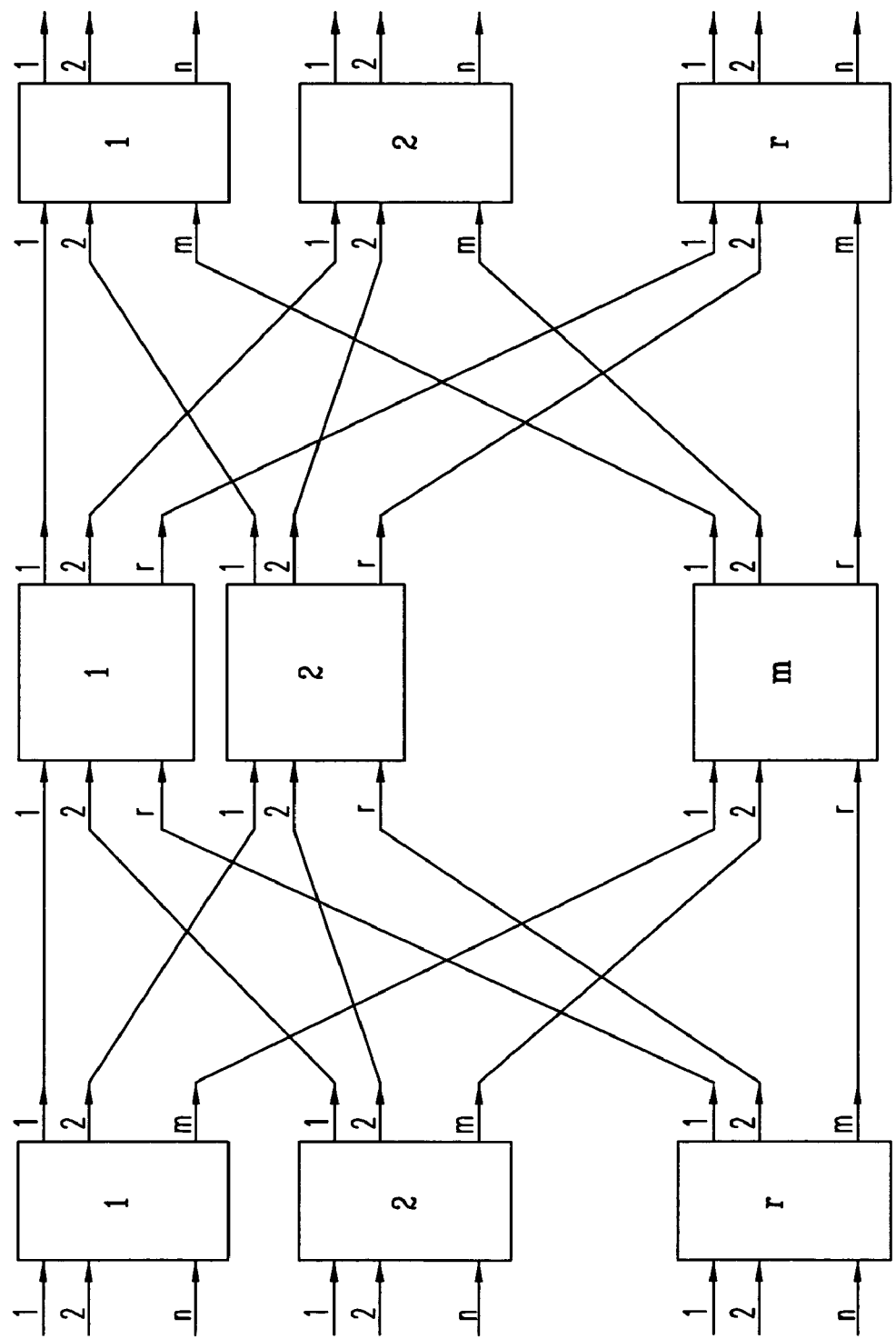

In some embodiments, communication switch 220 is a time-space-time switch of the type illustrated as item 100 in FIG. 1A, although in other embodiments, the configuration may be different (e.g. time-space-space-space-time switch). In case of a time-space-time switch, communication switch 220 uses a mapping 222 between its time slots and the connections to set up each of: the input time switch, the space switch and the output time switch. Specifically, the input time switch is programmed to ensure that information for the connection being mapped arrives at the appropriate time at the input port of the space switch, and the output time switch is programmed to ensure that information for the mapped connection is taken away by at the appropriate time, and the space switch is programmed to ensure that the information for the connection is transferred therethrough during the assigned time slot.

Although a graph stored in region 223B can be any graph that represents connections in a communication switch, in certain embodiments the graph includes a vertex for each connection, and an edge for each port that is shared by two connections (as described below in detail). The graph in region 223B is generated by processor 221 by execution of instructions (also called "graph generator") in region 223C that implement act 201 (FIG. 2B) in certain embodiments. In some embodiments, instead of storing an entire graph, only vertices are stored in region 223B, and software instructions are executed to identify edges that connect vertices, e.g. as described below in reference to the function Boolean is_neighbor.

Figure 2B:
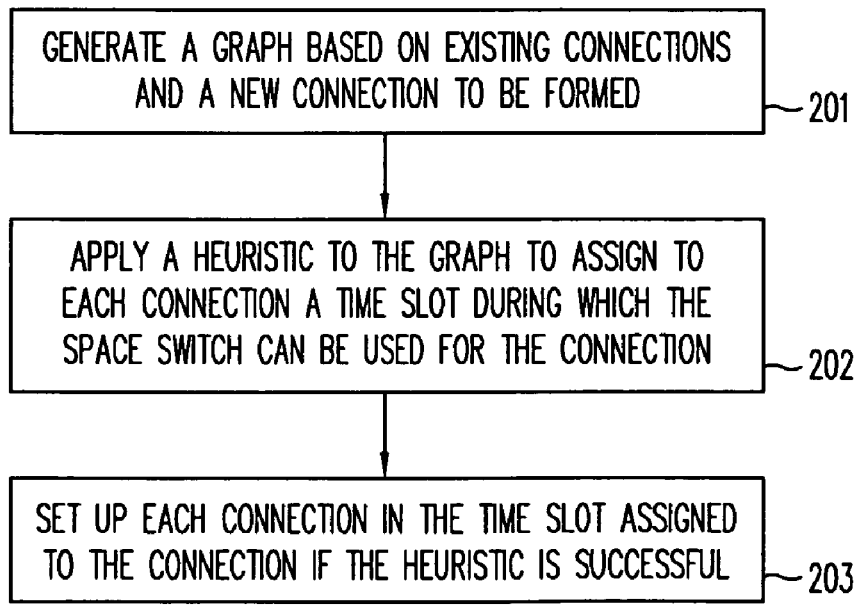
FIG. 2B illustrates, one embodiment of the flow chart of FIG. 2A, that uses a graph in reducing the problem of adding a new connection into an NP-complete problem in act 201.
Figure 2C:
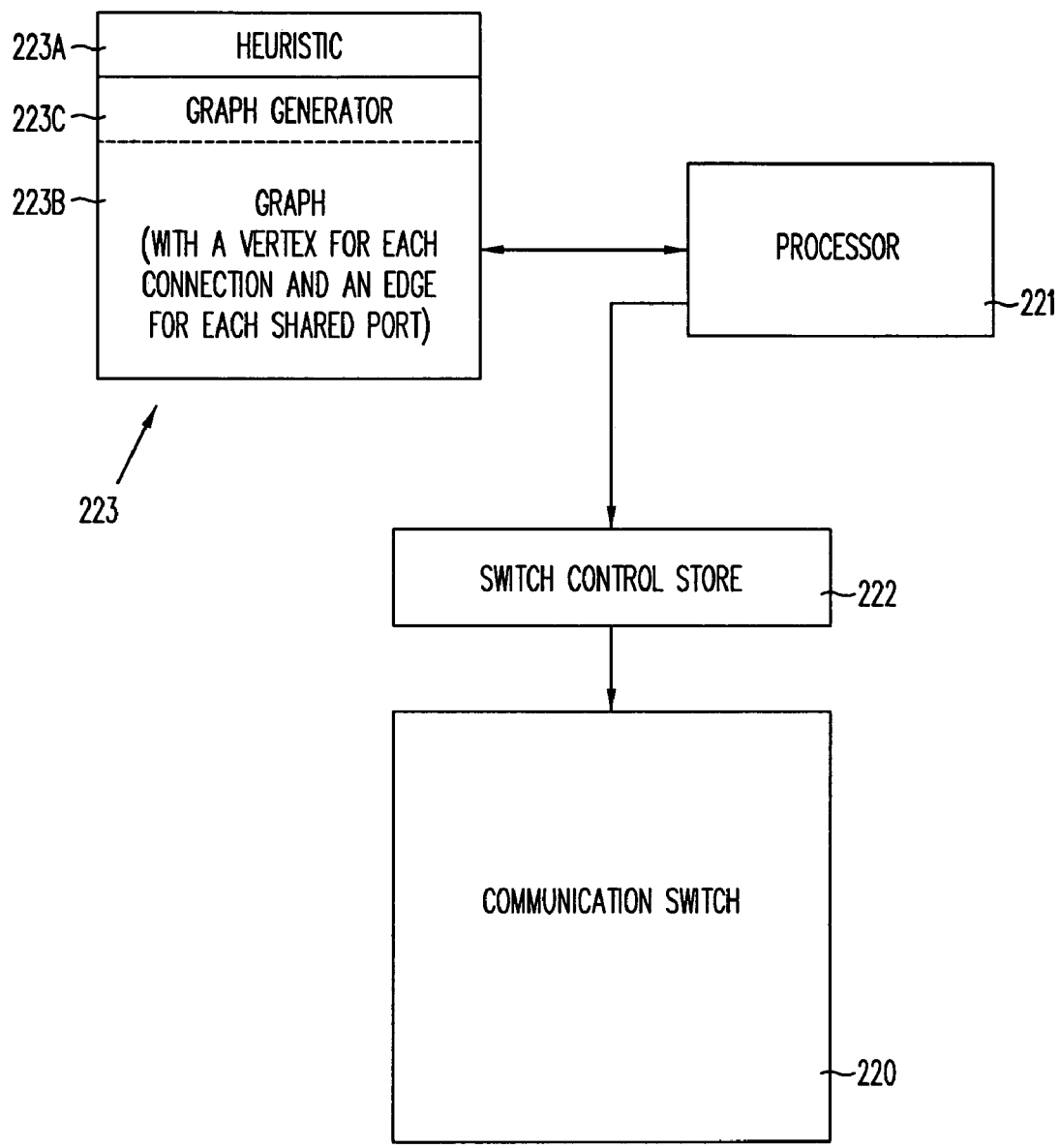
FIG. 2C illustrates, in a block diagram, a memory encoded with a graph whose vertices represent connections in a communication switch.

Moreover, a heuristic stored in memory region 223A which is applied in act 202 of FIG. 2B may be any heuristic (or resource-constrained exact algorithm) for solving an NP-complete problem expressed in the form of a graph. For example, in some embodiments, a heuristic to find sets of independent vertices is used in act 202. As another example, in certain embodiments, a processor 221 (FIG. 2C) that is coupled to a communication switch 220 treats each time slot as a color to be assigned to a connection (which can be either an edge or a node), and applies a heuristic (such as Brélaz's heuristic) to color (the edges or nodes of) the graph generated in act (a).

Brélaz's heuristic which is used in one embodiment is described in, for example, an article by Brélaz, D entitled "New Methods to Color the Vertices of a Graph." Communications of the Association for Computing Machinery 22, 251–256, 1979 that is incorporated by reference herein in its entirety. See also another article by Skiena, S. entitled "Finding a Vertex Coloring." §5.5.3 in Implementing Discrete Mathematics: Combinatorics and Graph Theory with Mathematica. Reading, Mass.: Addison-Wesley, pp. 214–215, 1990 also incorporated by reference herein in its entirety. Instead of Brélaz heuristic, any other coloring heuristic may be used in other embodiments including, for example, a quantum annealing heuristic, a simulated annealing heuristic, a branch and bound heuristic, a genetic algorithm and integer programming.

In some embodiments, on receipt of a request to set up a new connection (as per act 211 in FIG. 2C), processor 221 first checks (as per act 212) if all ports to be used by the new connection are unused in any single time slot. Acts 201–203 described above in reference to FIGS. 2A and 2B are performed only if no time slot is found during the checking in act 212. On the other hand if a specific time slot is found during the initial checking, processor 221 sets up the new connection in the specific time slot that was found (as per act 203C in FIG. 2C).

In some embodiments, the act 201 (FIG. 2B) of generating a graph includes representing (as per act 201 in FIG. 2C) each a connection as a vertex, and adding an edge between any two vertices if the corresponding connections share at least on input port or one output port. In such embodiments, a connection c may be identified by its set of input ports, $I^c$, and output ports, $O^c$, i.e. $c=(I^c;O^c)$. Therefore, in generating the graph, processor 221 connects two vertices c1 and c2 by an edge if and only if c1 and c2 share at least one port, which is determined as follows.

Boolean is_neighbor (c1, c2)
   if $(I^{c1} \cap I^{c2}) \neq \emptyset$ or $(O^{c1} \cap O^{c2}) \neq \emptyset$ then return true
   else return false
   end if In the above pseudo-code, the symbol ∩ represents intersection and the symbol ∅ represents an empty set.

Figure 3A:
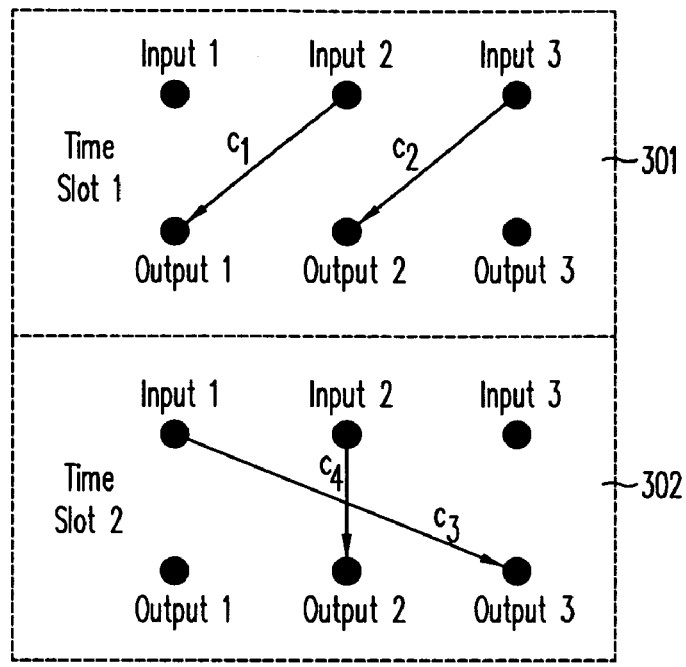
FIG. 3A illustrates, in a graph, existing connections in an example of a space switch in two time slots.

FIG. 3A illustrates an example of a 3×3 time-space-time switch that operates with two time slots. Suppose that four existing connections, $c_1$, $c_2$, $c_3$ and $c_4$ are connected as follows: $c_1$ is connected in the space switch from input port 2 to output port 1 using time slot 1; $c_2$ is connected from input port 3 to output port 2 using time slot 1; $c_3$ is connected from input port 1 to output port 3 using time slot 2; and $c_4$ is connected from input port 2 to output port 2 using time slot 2. These four connections are shown graphically in FIG. 3A for each of two time slots 301 and 302, with arrows from the input ports to the output ports.

Figure 2D:
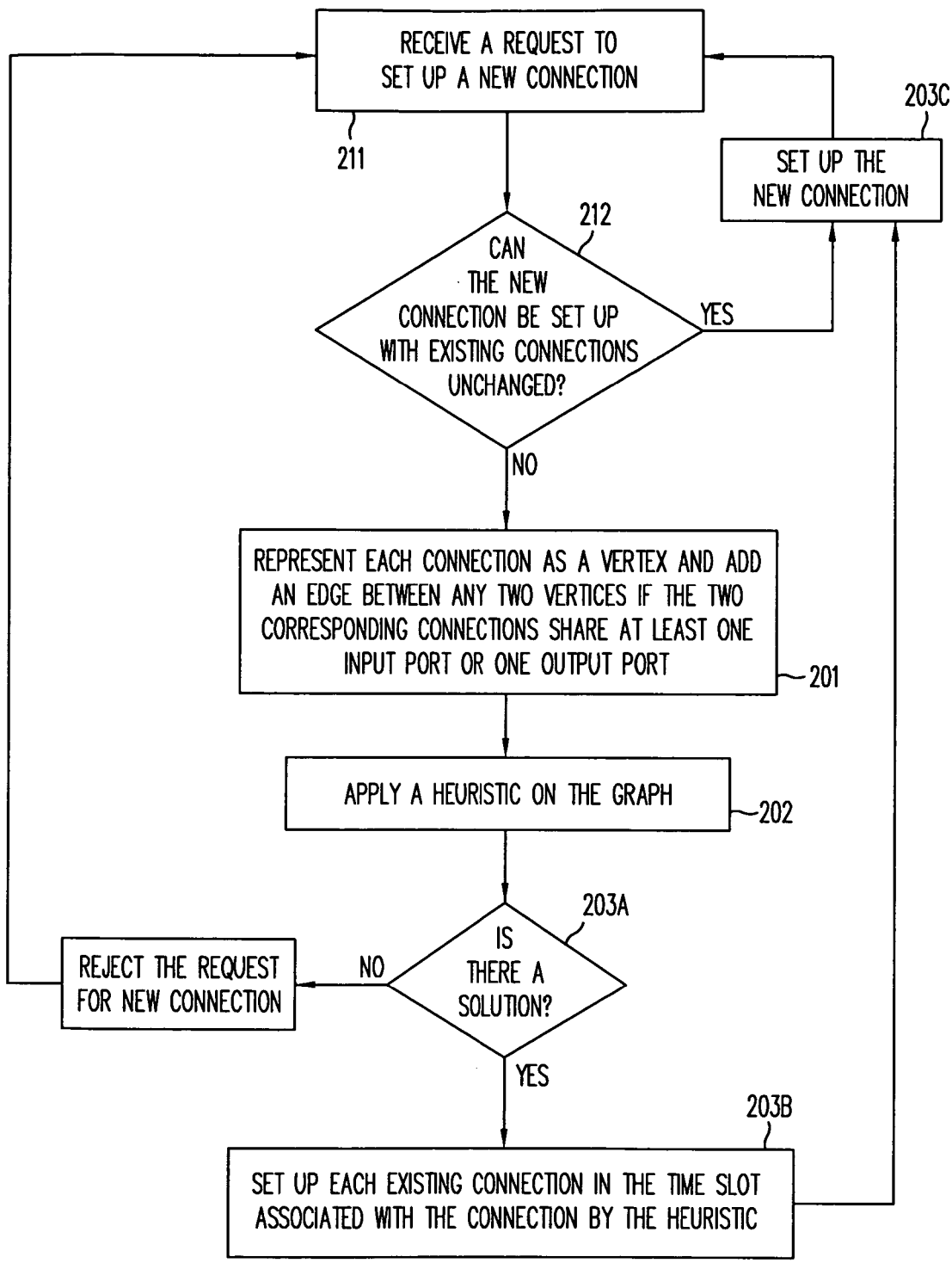
FIG. 2D illustrates, in a low-level flow chart, a method that implements the acts illustrated in FIG. 2B in one exemplary embodiment.

Suppose at this stage a new connection $c_5$, is to be connected from input port 3 to output port 3. In the example illustrated in FIG. 3A both the input and output ports of new connection $c_5$ are 3, and a time slot does not exist where both input port 3 and output port 3 are free. Specifically, in time slot 2, input port 3 is free and in time slot 1 output port 3 is free. Therefore, connection $c_5$ cannot be set up (as per act 212 in FIG. 2D) without moving one or more of the existing connections $c_1$–$c_4$ to a different time slot in the space switch.

Figure 3B:
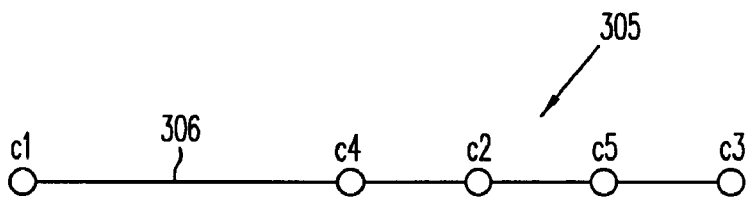
FIG. 3B illustrates, in a graph, connections in the example of FIG. 3A shown as vertices as per the method of FIG. 2B.

For this reason, act 201 (FIG. 2D) is performed, and results in a graph 305 (FIG. 3B). For example, all five connections $c_1$–$c_5$ are represented by vertices, and since connection $c_1$ shares an input port with connection $c_4$ and for this reason an edge 306 is added between these two connections. Next, a heuristic is applied to graph 305 as per act 202 (FIG. 2D), with the result that one time slot is assigned to connections $c_1$, $c_2$ and $c_3$ and another time slot is assigned to connections $c_4$ and $c_5$ (as illustrated in FIG. 3C).

Figure 3C:
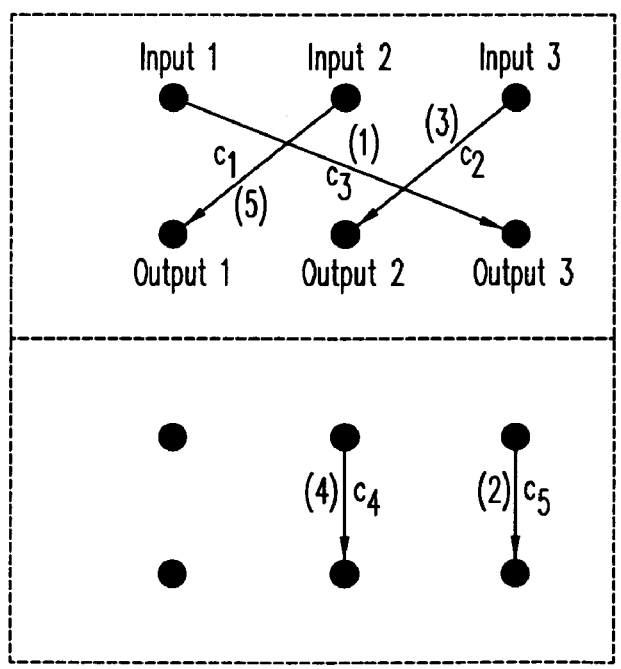
FIG. 3C illustrates, in a graph, rearrangement of the existing connections and a new connection

Although only two time slots are illustrated in FIGS. 3A and 3C, in one specific embodiment, the connections are rearranged in a communication switch with each port supporting an OC-48 line rate, space switching granularity of STS-1, and the number of time slots is 48. In an alternative embodiment, an OC-192 line rate is supported, the space switching granularity is at the Virtual Tributary (VT) level, and the number of time slots is 5376. Note that the just-described line rates are at the input and output ports of a space switch, and in certain examples the space switch has 24 ports or even 32 ports. Each of the time switches that are coupled to the space switch may themselves have different line rates to the outside world, e.g. in case of an OC-48 line rate space switch, a time switch may have one OC-48 port, or four OC-12 ports or sixteen OC-3 ports or fortyeight STS-1 ports. These are just examples of certain characteristics of a time-space-time switch which may be used in certain embodiments of the invention.

The specific heuristic that is applied to graph 305 can be different in different embodiments, e.g. some embodiments apply a vertex coloring heuristic (such as Brélaz's heuristic) wherein each color represents a time slot, while some other embodiments apply an independent set heuristic to classify into sets vertices that are independent wherein each set represents a time slot.

SONET networks which carry public telephony information are required to provide protection from equipment failure and fiber cuts. For this reason, SONET networks (usually in ring topology) provide two paths, a working and a protect (also called standby) path, on which the information flows. In a bridged (also called 1+1) protected connection, information is sent on both the working and the protect paths, and the destination receiver selects the stream with the least bit error rate. On the other hand, in an unbridged (also called 1:1) protected connection, the information is sent only on the working path. If the working path fails (because of equipment failure or fiber cut), then the destination node detects the failure and informs the source (via the protect return path) to switch to the protect path.

During normal operation, low priority connections, called extra traffic connections can be set up on the protect path and when a protection switch occurs, these extra traffic connections are dropped. SONET standards specify that protection switching has to be completed within 50 milliseconds of failure. Hence, in some embodiments, the above-described rearrangement method is not run to determine a protect path after a failure occurs. Instead, each protect path is pre-allocated, to use the same time slot as the working path in the space switch.

For example, if traffic from working input port $w_i$ to working output port $w_o$ is carried during time slots $k_1$, $k_2 \ldots k_n$ and extra traffic (to be dropped) is carried to port $d_j$ in time slot $1_j$. Assuming a bridged protection protocol, when a failure is detected in working input port $w_i$, then output ports $w_o$ and $d_j$ start listening to protect input port $p_i$ by setting the space switch control matrix as follows: Locations $(w_o, k_1) \ldots (w_o, k_n)$ and $(d_j, 1_j)$ are switched from $w_1$ to $p_i$. If all connections are bridged, then the setting of protect output port $p_o$ is identical to that of $w_o$. However, if the connections are unbridged and if the protect path carries extra traffic, then the setting of the protect output port $p_o$, will be different from the working output port $w_o$.

For this reason, some embodiments distinguish between protected and unprotected connections, by adding to the description $(I^c; O^c)$ of each connection, a boolean flag. Moreover, to represent bridged versus unbridged connections, this embodiment specifies in the set of all connections, both kinds of ports: ports (also called "working ports") used in normal operation and ports (also called "standby ports" or "protection ports") used when protection switching occurs. A connection c is described as $c=(p^c, I^c_w, O^c_w, I^c_p, O^c_p)$ where $p^c$ is a boolean variable and is true if the connection is currently using protection ports. The set $(I^c_w, O^c_w)$ represents the set of input and output ports used by connection c during normal operation. The set $(I^c_p, O^c_p)$ represents the set of input and output ports that are used by connection c when protection switching occurs.

In a bridged connection, set $(I^c_w, O^c_w)$ contain both sets of ports: (a) working input and output ports and (b) protection input and output ports because both the working and protection ports are used during normal operation to transmit data on the working and protection connections through the TST switch. Set $(I^c_p, O^c_p)$ is empty for bridged connections. On the other hand, in an unbridged connection, set $(I^c_w, O^c_w)$ contains only the working input and output ports and set $(I^c_p, O^c_p)$ is not empty, i.e. contains the protection input and output ports. The purpose of splitting the set of input and output ports into the just described two sets, namely working set $(I^c_w, O^c_w)$ and protection set $(I^c_p, O^c_p)$ is that a low priority connection carrying extra traffic can use ports in protection set $(I^c_p, O^c_p)$ and still be a non-neighbor of a connection being protected by either of the ports used by the extra traffic connection.

Specifically, in one embodiment, two protected connections are neighbors if they share any port in their definitions "c" (described above). If one of the connections is unprotected, then they are neighbors only if they share ports used in normal operation. For example, if connection c1 is an unbridged protected connection and connection c2 carries extra traffic through ports that are same as the protection ports of c1, then, as per the above rule, c1 and c2 are not neighbors and can be assigned the same time slot (color) in the space switch.

```
Boolean is_neighbor (c1, c2)
  if {c1 and c2 are both protected connections}
    if{((I^c1_w U I^c1_p) ∩ (I^c2_w U I^c2_p)≠∅)   or   ((O^c1_w U O^c1_p) ∩
        (O^c2_w U O^c2_p)≠∅)}
      then return true
    else
      return false
    endif
  else
    if {((I^c1_w ∩ I^c2_w)≠∅) or ((O^c1_w ∩ O^c2_w)≠∅)}
      then return true
    else
      return false
    endif
  endif
```

In the above pseudo-code, the symbol U represents union.

Figure 4:
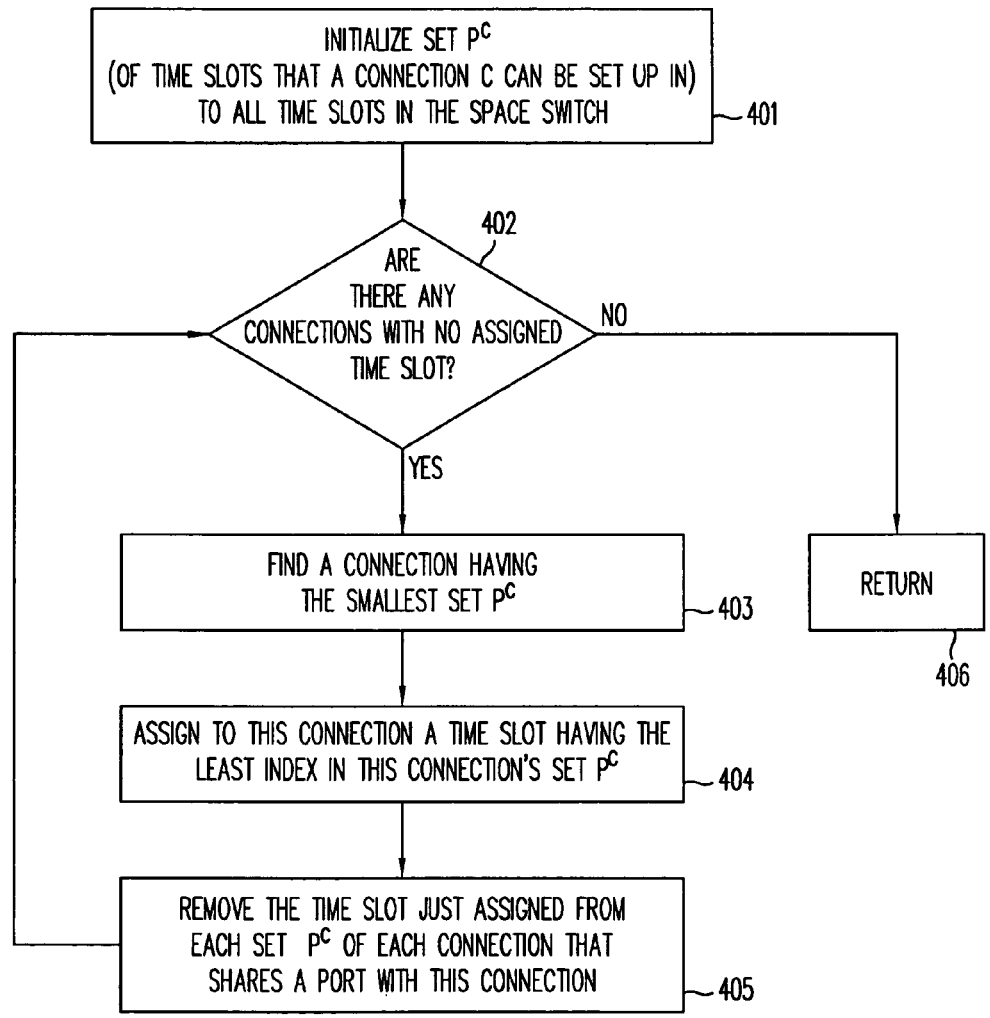
FIG. 4 illustrates, in a flow chart, implementation in one exemplary embodiment, of act 202 in FIG. 2B based on Brélaz's heuristic.

In certain embodiments processor 221 is programmed to reduce the connection rearrangement problem to a vertex coloring problem. As noted above, some embodiments use Brélaz's heuristic which is also known as the 'DSatur' (Saturation Degree) algorithm. The saturation degree of a vertex is the number of colors used by its neighbors. At each step, Brélaz's heuristic colors a vertex with the maximum saturation degree (i.e. the vertex that has the maximum number of colored neighbors). During application of the heuristic, one embodiment of a processor 221 maintains for each vertex c of the graph (i.e. with each connection), a set of possible colors $p^c$ that the vertex c can receive. In this case, the possible colors represent each possible time slot $t_S$ that a connection c can use in the space switch. For each vertex c, processor 221 initializes set $p^c$ to the set of all colors (time slots in the space switch) as illustrated by act 401 in FIG. 4.

While there are uncolored vertices do (see act 402 in FIG. 4)
  find the vertex c having a set $p^c$ of the minimum size (see act 403); in case of ties, choose c with the maximum vertex degree in the uncolored subgraph.
  assign the color k with the least index in the set $p^c$ to the vertex c (see act 404);
  for each neighbor n of c, remove the color k from the set $P^n$ (see act 405)
end while When a request to establish the connection c is received, first an attempt is made to assign a color (that represents a time slot) to the new vertex (that represents a connection), without recoloring the graph. First all the neighboring vertices of vertex c are found, and their assigned color is deleted from the set $P^c$. If $P^C$ remains nonempty, then the color with the least index in $P^c$ is assigned to the new vertex (representing connection c). If, on the other hand, $P^c$ becomes empty, then an attempt is made to recolor the graph using the Brélaz's heuristic on a copy of the graph. If the heuristic succeeds in finding an N-coloring (where N is the number of time slots) of the graph, then the copy of the graph is retained, else the copy is discarded and the connection c is rejected.

Rearrangement of connections as described above may be used in video distribution networks in which SONET switches are required to do drop-and-continue functionality. This is a multicast function where the information in a set of time slots is both dropped to the local drop ports and also sent as through traffic. In this case the multicast fanout is equal to the number of drop ports plus the working and protect output ports.

Although in certain embodiments, use of a graph to model the NP-complete problem is explicit as discussed above, in other embodiments there is no explicit graph, and instead, a method that is obtained by transforming a heuristic (that is normally applied to a graph) into a method that is specific to rearrangement of MIMO connections in a space switch. In several such embodiments, the method performs the following acts:
  initialize a set pC, of time slots that a connection can be set up in,
    to all time slots available in the communication switch;
    while there are connections with no assigned time slot do
    {
    find a connection "s" having the smallest set $P^s$;
    assign, to connection "s", a time slot with the least index in set $P^s$; and
    remove the assigned time slot, from set P of each connection that has no assigned time slot and that shares a port with connection "s"
    }
    endwhile As can be seen from the above pseudo-code, a graph need not be explicitly used in certain embodiments, even while implementing Brélaz's heuristic (which is a graph coloring heuristic) to rearrange connections in a communication switch.

If only the bridged protocol is used for all connections through the communication switch, and if there is no support for drop-and-continue functionality, then the working and protection ports are identical and can be represented as one port in a graph of the type described above. Hence, the problem of adding a connection reduces to the problem of unicast rearrangement. In such a case, Paull's algorithm can be used to implement the rearrangement. Moreover, in embodiments where all connections c are in fact unicast connections, Paull's algorithm may be used. Paull's algorithm may be applied to a graph that represents connections in a communication switch, in the following manner. Let the input port and the output port of a new unicast connection c, be i and j, respectively.

IF {a time slot where both input port i and output port j are free is found}
THEN connect c using the time slot found (note that in such a case, there is no need to rearrange any existing connections).
ELSE IF {find a time slot a, where input port i is free and different time slot b, where the output port j is free}
THEN merge the connections in both time slots a and b into one of the time slots (say slot a) and also add the new connection in it (note that these connections form a set of maximal length paths). Next, traverse each maximal length path, placing the odd connection in one time slot (say slot a) and even connection in the other time slot (say slot b).
ELSE connection c cannot be admitted (i.e. in this case, connection c is blocked)
ENDIF In the example illustrated in FIG. 3A, when applying Paull's algorithm, processor 221 is programmed to first merge the connections in time slot 2 into time slot 1 and also add the new connection in time slot 1. This operation results in one maximal path ($c_3$, $c_5$, $c_2$, $c_4$, $c_1$) as shown in FIG. 3B. Next, all odd connections, ($c_3$, $c_2$, $c_1$) are placed into time slot 1 and all even connections ($c_5$, $c_4$) are placed into time slot 2, as shown in FIG. 3C.

When using unbridged protection protocols, extra traffic or the drop-and-continue functionality, then, processor 221 does not use Paull's algorithm. Instead, processor 221 is programmed to perform rearrangement methods described above in reference to FIG. 2A or 2B that are used to handle general MIMO connections (e.g. based on Brélaz's heuristic). Note that the extra traffic needs to be carried on the same time slot as the through traffic. If the extra traffic originates from input port e, then the MIMO connection will have 3 input ports: $w_i$, $p_i$ and e. On the other hand, in bridged protocols, the maximum number of input ports of a connection is 2: $w_1$ and $p_i$.

Moreover, for a TST switch to support protection rings and/or drop-and-continue functionality in SONET networks, the connections that need to be set up are not unicast connections (that are handled by Paull's algorithm), but are multicast connections, such as multiple input ports to multiple output ports (MIMO) connections. Rearrangement of MIMO connections may be reduced to a graph coloring problem and soved by use of Brélaz's heuristic as noted above, or even by use of a genetic algorithm. For example, processor 221 may be programmed in the manner described in an article entitled "Graph Coloring with Adaptive Genetic Algorithms" by A. E. Eiben and J. K. van der Hauw Journal of Heuristics, 4(1), 1998; available on the Internet at http://www.wi.leidenuniv.nl/~gusz/graphcol.ps.gz. The just-described article is incorporated by reference herein in its entirety.

An apparatus and method of the type described herein can be implemented in any communication network, for example to control the operation of a digital cross connect (DCC) and/or add-drop multiplexor (ADM) that adheres to the SONET standard. Examples of devices that may be used in certain embodiments of the invention include, for example, products 5000, 6000 and 7000 available from Tellabs, any product in the FLASH series available from Fujitsu, and any product in the OPTera series available from Nortel Networks.

Moreover, certain embodiments of the invention may be implemented in an optical access platform (OAP) that provides network access and transport features with high-density metallic and fiber connectivity in the same chassis. Such OAPs may feature a line card and chassis architecture that can include digital loop carrier (DLC) and digital subscriber line access multiplexer (DSLAM) functions used in local-loop networks, and also provide optical add/drop multiplexing for on-board SONET, dense wave division multiplexing (DWDM), and Gigabit Ethernet services with optical interfaces to fiber networks. Embedded edge switching, routing, and digital cross connect functions work together in certain OAPs in accordance with the invention, to process, groom, and manage any combination of time-division-multiplexing (TDM), cell, and packet traffic, including asynchronous transfer mode (ATM), frame relay, and internet protocol/multiprotocol label switching (IP/MPLS). One example of such an OAP is the product C7 available from Calix Networks, Inc., although other chassis from other vendors may be used in other embodiments.

Numerous modifications and adaptations of the embodiments described herein will be apparent to a skilled artisan in view of the disclosure.

For example, in certain embodiments, a MIMO connection rearrangement problem is reduced (as per act 201 in FIG. 2A) to the boolean satisfiability (SAT) problem as follows. Specifically, a processor 221 sets a boolean variable $x_{ij}$ to true if connection i can be assigned to time slot j. Processor 221 prepares two types of clauses as follows. Clauses of a first type (also called "vertex" clauses) are prepared, one clause for each connection i, to be the logical OR function of all variables $x_{ij}$ with j=1 to j=N, wherein N is the total number of time slots. For example, a vertex clause for connection i is as follows: $x_{i1}+x_{i2}+x_{i3}+ \ldots x_{ij}+ \ldots x_{iN}$. If there are a total of Z connections, then processor 221 prepares a total of Z clauses of this first type. Clauses of a second type (also called "edge" clauses) are prepared, one clause for each pair of connections that share at least one input port or at least one output port, to be the logical OR function of the inverse (i.e. logical NOT) of the two boolean variables, for all slots j=1 . . . N. For example, an edge clause for connections i1 and i2 that share a port is: $(!x_{1j}+!x_{i2j})$ wherein ! denotes inverse. Thereafter, such embodiments use any heuristic (or resource-limited exact algorithm) to find a satisfiable solution to the above set of clauses (vertex clauses and edge clauses) thereby to identify the slot assignment for each connection. For example, a recursive Davis-Putnam Procedure may be used as follows.

Boolean Davis_Putnam_Procedure (formula F)
{
if (Davis_Putnam_Procedure (F with 'TRUE' assigned to the first variable) return (TRUE);
return (Davis_Putnam_Procedure (F with "FALSE" assigned to the first variable)
}

For more information, see an article by Davis, M. and Putnam, H. entitled "A Computing Procedure for Quantification Theory", Journal of the Association for Computing Machinery, 7(3) (July 1960), 201–215 that is incorporated by reference herein in its entirety. See also, another article entitled "Implementing the Davis-Putnam Method" by Hantao Zhang and Mark E. Stickel, Kluwer, Journal of Automated Reasoning 24(1/2): 277–296 (2000) that is also incorporated by reference herein in its entirety.

In one example, a graph of the type illustrated in FIG. 3B has three connections represented by three nodes which are connected as follows: 1-2-3 (i.e. node 2 is connected to each of nodes 1 and 3). In this example, the clauses are as follows:

$(x_{11}+x_{12})(x_{21}+x_{22})(x_{31}+x_{32})(!x_{11}+!x_{21})(!x_{12}+!x_{22})$
$(!x_{21}+!x_{31})(!x_{22}+!x_{32})$

In this particular example, there is a satisfiable solution, namely $x_{11}$=TRUE, $x_{22}$=TRUE and $x_{31}$=TRUE and all other variables are FALSE. Such a solution may be found by Davis-Putnam Procedure as discussed above.

Furthermore, in certain embodiments, instead of a space switch in communication switch 220 being an electrical cross-connect switch, the space switch is an optical switch, and instead of time slots, wavelengths are assigned to each connection through the optical switch.

Although in some embodiments a single processor 221 is used, in other embodiments different processors may perform the individual acts of a method of the type illustrated in FIGS. 2A and 2B, so that these processors together as a group perform such a method.

Moreover, although certain heuristics have been described in certain embodiments for use in rearranging connections in a communication switch, any combination of the described heuristics or portions thereof may be used in other embodiments.

Numerous such modifications and adaptations of the embodiments described herein are encompassed by the attached claims.

The invention claimed is:

1. A method of controlling operation of a communication switch, the method comprising:
   reducing a problem of setting up a new connection through the communication switch into an NP-complete problem;
   wherein the act of reducing comprises transforming into a vertex of a graph, each connection in a set comprising:
      a plurality of connections existing in the communication switch; and
      said new connection;
   wherein the act of reducing further comprises adding an edge between two vertices in said graph if and only if two connections corresponding thereto share at least one input port or share at least one output port;
   applying a heuristic to the NP-complete problem; and
   setting up the new connection using a solution from the heuristic, if the heuristic is successful.

2. The method of claim 1 wherein each time slot is treated as a color and the heuristic is Brélaz's heuristic.

3. The method of claim 1 wherein:
   the heuristic assigns to each connection a time slot during which a portion of the communication switch can be used for the connection.

4. The method of claim 1 wherein the communication switch operates with a plurality of time slots, the method further comprising:
   checking if all ports to be used by the new connection are unused in any time slot;

wherein the acts of reducing, applying and setting up are performed only if no time slot is found during the checking; and if a specific time slot is found during checking, setting up the new connection in the specific time slot.

5. The method of claim 1 wherein at least one of the connections is a multicast connection.

6. The method of claim 1 wherein at least one of the connections is between multiple input ports and multiple output ports (MIMO).

7. A method of controlling operation of a communication switch, the method comprising:

reducing a problem of setting up a new connection through the communication switch into an NP-complete problem;

applying a heuristic to the NP-complete problem; and setting up the new connection using a solution from the heuristic, if the heuristic is successful;

wherein the act of applying comprises:

initializing a set $P^c$, of time slots that a connection can be set up in, to all time slots available in the communication switch; and while there are connections with no assigned time slot doing the following: finding a connection having the smallest set $P^c$;

assigning to the connection a time slot with the least index in the smallest set $P^c$; and removing the time slot just assigned from set $P^c$ of each connection that shares a port with the connection having the smallest set $P^c$.

8. The method of claim 7 wherein the heuristic is Brélaz's heuristic.

9. The method of claim 7 wherein a graph is used implicitly.

10. The method of claim 7 further comprising:

checking if all ports to be used by the new connection are unused in any time slot;

wherein the acts of reducing, applying and setting up are performed only if no time slot is found during the checking; and if a specific time slot is found during checking, setting up the new connection in the specific time slot.

11. A method of setting up a new connection through a communication switch, the method comprising:

for each connection "c" in a set of (the new connection and a plurality of connections existing in the communication switch), initializing a set Pc of time slots that connection "c" can be set up in, to all time slots available in the communication switch; and while there are connections with no assigned time slot:

finding a connection "s" having the smallest set Ps;

assigning, to connection "s", a time slot with the least index in set Ps; and removing the assigned time slot, from set P of each connection that has no assigned time slot and that shares a port with connection "s".

12. The method of claim 11 wherein at least one of the connections is a multicast connection.

13. The method of claim 11 wherein at least one of the connections is between multiple input ports and multiple output ports (MIMO).

14. A method of controlling operation of a communication switch, the method comprising:

reducing a problem of setting up a new connection through the communication switch into an NP-complete problem;

wherein the act of reducing comprises transforming into an edge of a graph, each connection in a set comprising:

a plurality of connections existing in the communication switch; and said new connection;

wherein the act of reducing further comprises adding a vertex between two edges in said graph if and only if two connections corresponding thereto share at least one input port or share at least one output port;

applying a heuristic to the NP-complete problem; and setting up the new connection using a solution from the heuristic, if the heuristic is successful.

15. The method of claim 14 wherein each time slot is treated as a color and the heuristic is Brélaz's heuristic.

16. The method of claim 14 wherein:

the heuristic assigns to each connection a time slot during which a portion of the communication switch can be used for the connection.

17. The method of claim 14 wherein at least one of the connections is a multicast connection.

18. The method of claim 14 wherein at least one of the connections is between multiple input ports and multiple output ports (MIMO).

19. An apparatus comprising:

a communication switch;

a processor coupled to the communication switch; and a computer readable storage medium coupled to the processor and encoded with a set of computer instructions that:

reduce a problem of setting up a new connection through the communication switch into an NP-complete problem;

wherein the computer instructions to reduce comprise instructions to transform into a vertex of a graph, each connection in a set comprising:

a plurality of connections existing in the communication switch; and said new connection;

wherein the computer instructions to reduce further comprise instructions to add an edge between two vertices in said graph if and only if two connections corresponding thereto share at least one input port or share at least one output port;

apply a heuristic to the NP-complete problem; and set up the new connection using a solution from the heuristic, if the heuristic is successful.

20. An apparatus comprising:

a communication switch;

a processor coupled to the communication switch; and a computer readable storage medium coupled to the processor and encoded with a set of computer instructions that:

reduce a problem of setting up a new connection through the communication switch into an NP-complete problem;

wherein the computer instructions to reduce comprise instructions to transform into an edge of a graph, each connection in a set comprising:

a plurality of connections existing in the communication switch; and said new connection;

wherein the computer instructions to reduce further comprise instructions to add a vertex between two edges in said graph if and only if two connections corresponding thereto share at least one input port or share at least one output port;

apply a heuristic to the NP-complete problem; and set up the new connection using a solution from the heuristic, if the heuristic is successful.

21. An apparatus comprising:
a communication switch;
a processor coupled to the communication switch; and
a computer readable storage medium coupled to the processor and encoded with a set of computer instructions that:
for each connection "c" in a set of (the new connection and a plurality of connections existing in the communication switch), initialize a set Pc of time slots that connection "c" can be set up in, to all time slots available in the communication switch; and
while there are connections with no assigned time slot:
find a connection "s" having the smallest set Ps;
assign, to connection "s", a time slot with the least index in set Ps; and
remove the assigned time slot, from set P of each connection that has no assigned time slot and that shares a port with connection "s".

* * * * *

UNITED STATES PATENT AND TRADEMARK OFFICE
CERTIFICATE OF CORRECTION

| | | |
|---|---|---|
| PATENT NO. | : 7,187,672 B1 | Page 1 of 1 |
| APPLICATION NO. | : 10/147446 | |
| DATED | : March 6, 2007 | |
| INVENTOR(S) | : Vishnu | |

It is certified that error appears in the above-identified patent and that said Letters Patent is hereby corrected as shown below:

Column 12
Line 56, "claim 1" should be changed to --claim 3--.

Column 14
Line 13, "claim 14" should be changed to --claim 16--.

Signed and Sealed this

Twentieth Day of November, 2007

JON W. DUDAS
*Director of the United States Patent and Trademark Office*